April 9, 1957     H. E. LATOURELL     2,788,178
JUNCTION BOXES FOR SPACE HEATERS
Filed Aug. 28, 1953     2 Sheets-Sheet 1
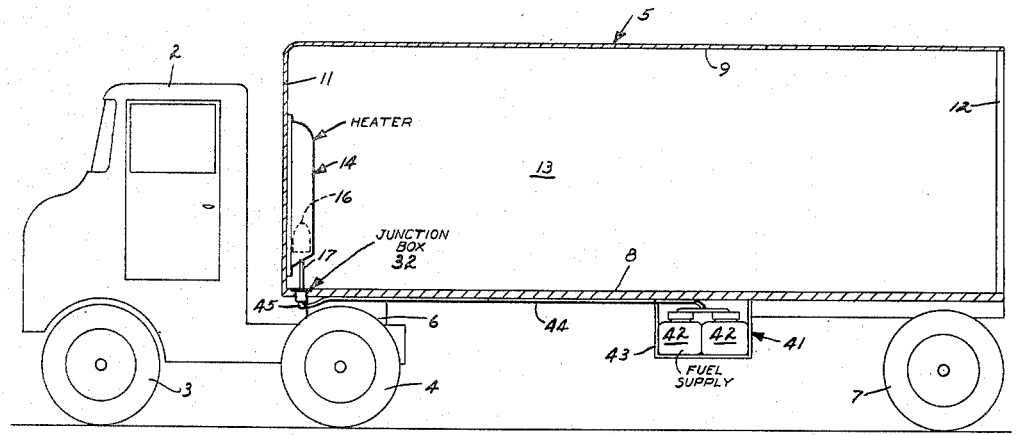
FIG. 1
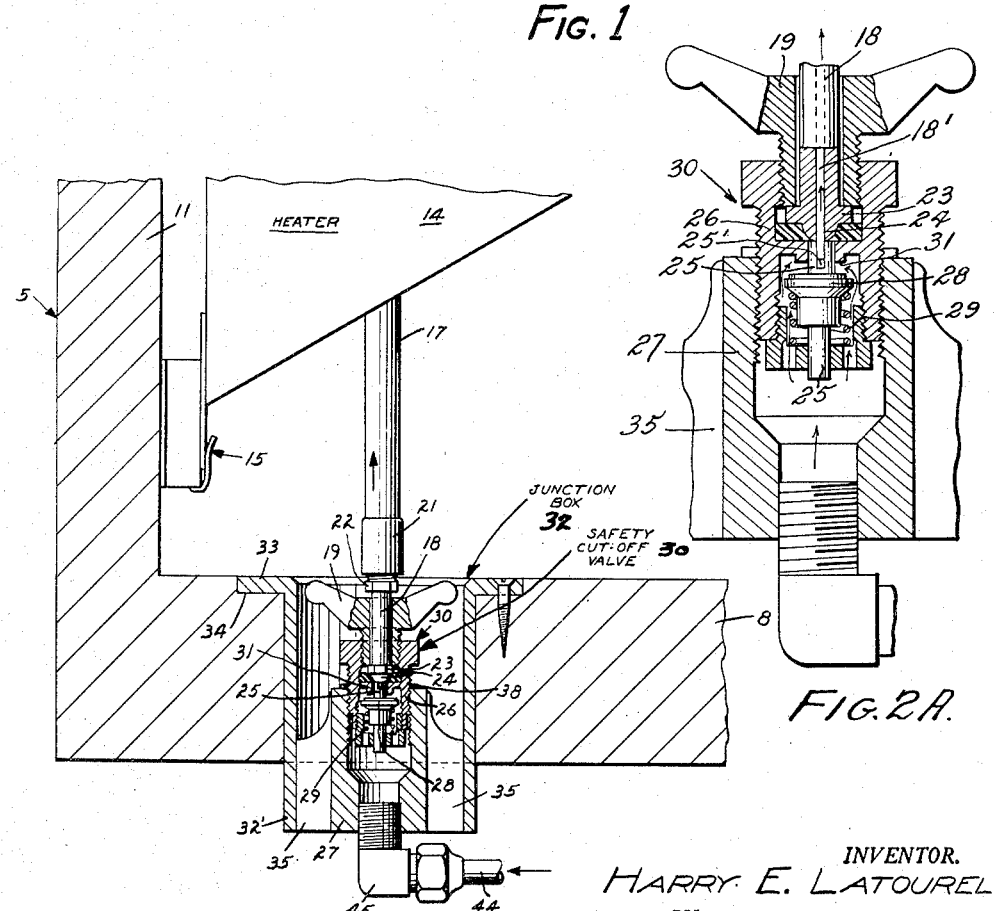
FIG. 2
FIG. 2A.
INVENTOR.
HARRY E. LATOURELL
BY
Paul, Moore + Dugger
ATTORNEYS April 9, 1957     H. E. LATOURELL     2,788,178
JUNCTION BOXES FOR SPACE HEATERS
Filed Aug. 28, 1953     2 Sheets-Sheet 2

INVENTOR.
HARRY E. LATOURELL
BY Paul, Moore + Dugger
ATTORNEYS

United States Patent Office 2,788,178
Patented Apr. 9, 1957

2,788,178

JUNCTION BOXES FOR SPACE HEATERS

Harry E. Latourell, Minneapolis, Minn.

Application August 28, 1953, Serial No. 377,178

2 Claims. (Cl. 237—32)

This invention relates to new and useful improvements in heating systems for truck bodies, and more particularly to a novel junction box adapted for use in connection with such systems.

Transport trucks such as utilized for transporting perishable products and other merchandise long distances, are usually equipped with space heaters for heating the cargo space within the vehicle body. Such heaters are commonly equipped with gas burners and may utilize a highly volatile fuel gas, such as propane gas, which is highly explosive when released to the atmosphere. Extreme care must therefore be exercised in the operation of such burners to prevent leakage of the highly explosive fuel gas into the cargo space, and particularly in the construction of the fuel supply line or conduit for conducting the fuel gas from the fuel supply means, usually located exteriorly of the cargo space, to the burner assembly located within the cargo space.

There are times during each season when it may be unnecessary to heat the interior of a truck body, as during the summer months, and during such periods it may be deemed advisable to remove the space heater from the cargo space within the truck body to increase the cargo carrying capacity of the truck. It is therefore customary to removably mount the space heaters in cargo carrying trucks whereby such heaters may readily be removed therefrom when it is no longer necessary to heat the interiors of the trucks. When a space heater is thus removably mounted in a truck body, it becomes necessary to provide a coupling in the fuel supply line which may readily be uncoupled when the heater is to be removed from the cargo space. Such a coupling must be so constructed that there will be no danger of leakage of the highly explosive fuel gas into the cargo space, and it is an object of the present invention to provide a junction box adapted for mounting in the floor of a truck body for housing the coupling in the fuel line, and to facilitate operating the coupling when it is desired to uncouple the two sections of the fuel supply to remove the heater from the cargo space, or when coupling them together as when mounting the heater in the cargo space.

A further object of the invention is to provide a junction box adapted for mounting in the floor or a wall of a truck body, and having a safety cut-off valve permanently mounted therein, the intake side of which may be permanently connected to one end of a fuel supply conduit having its opposite end connected to the usual fuel supply means located exteriorly of the truck body.

A further object is to provide a novel junction box comprising a tubular body having means for supporting it in position in an opening in the truck floor with its upper end flush therewith to permit the movement of cargo over the top of the junction box, when the space heater has been removed from within the truck body, said junction box comprising a central reduced hub having a safety cut-off valve permanently mounted therein, the lower end of which is in direct communication with one end of an exteriorly mounted fuel supply conduit, and the upper or opposite end of the safety cut-off valve being threaded to receive a coupling member carried by the lower end of an inner fuel conduit having its opposite end connected to the usual burner assembly of the truck heater, said coupling member being located wholly within the junction box, whereby it is not likely to interfere with cargo or merchandise moved over the surface of the truck floor above the junction box.

A further object is to provide a junction box of the class described, having means therein for supporting a safety cut-off valve comprising a spring-actuated plunger which is normally in closed position, but is adapted to be opened by manipulation of a coupling member for coupling the inner fuel supply conduit to the cut-off valve, whereby when the coupling member is manipulated to thus connect the inner fuel conduit to the cut-off valve, said spring-actuated plunger is moved into open position to permit free flow of fuel from the fuel supply means through the safety cut-off valve to the burner assembly, said coupling member when manipulated to disconnect the inner fuel conduit from the safety cut-off valve, permitting the spring-pressed plunger thereof to return to its normal closed position to prevent leakage of the fuel gas into the vehicle body.

A further and more specific object of the invention resides in the construction of the junction box which comprises a reduced axially disposed hub having means for fixedly supporting it within the tubular body of the junction box with its wall spaced from the inner surface of said tubular body, thereby to provide an air-circulating passage through the junction box to permit the heavier-than-air fumes or gases within the vehicle body to escape therefrom to the atmosphere through the junction box.

Other objects of the invention reside in the construction of the upper end of the tubular body of the junction box which has an enlarged horizontal flange adapted to be received in a correspondingly shaped recess provided in the floor of the truck body, whereby the upper end of the tubular body of the junction box is flush with the truck floor, thereby to permit cargo and merchandise to be readily moved over the junction box without interference therefrom; in the location of the safety cut-off valve and the coupling member within the junction box, and in the provision of an annular seat in the upper portion of the tubular body of the junction box adapted to receive a closure member or cap for completely closing the opening through the junction box, when the inner fuel conduit is detached from the safety cut-off valve, as when the heater is removed from within the cargo space of the truck body.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a schematic illustration of a conventional transport truck showing the invention embodied therein;

Figure 2 is an enlarged detail sectional view showing the junction box mounted in the truck floor, and the inner and outer conduit sections coupled together within the junction box;

Figure 2A is an enlarged detail sectional elevation of the safety cut-off valve shown in Figure 2, to more clearly illustrate the construction and operation thereof, the valve being shown in open position, as when gas is flowing therethrough to the burner;

Figure 3:
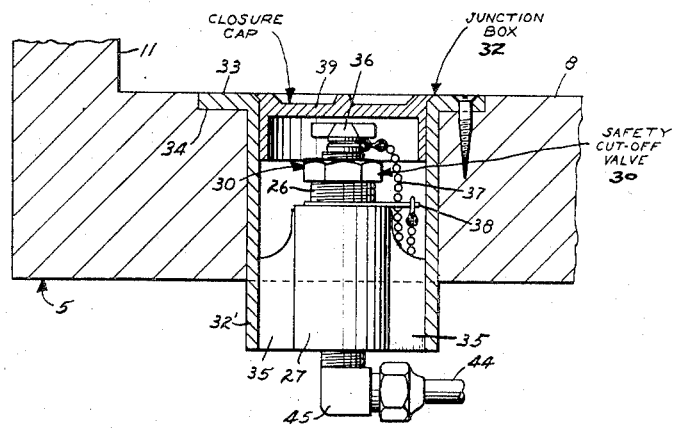
Figure 3 is a view similar to Figure 2, with some of the parts omitted, showing the flexible fuel conduit of the heater assembly disconnected from the safety cut-off valve, and the closure cap inserted into the upper end of the junction box to prevent air flow therethrough.

In the selected embodiment of the invention herein disclosed there is illustrated in Figure 1, for purposes of disclosure, a schematic representation of a conventional truck comprising the usual driver's cab 2 mounted on wheels 3 and 4, and having a trailer-type truck body 5 coupled thereto by the usual fifth wheel or coupling member, generally indicated by the numeral 6. The rear end of the trailer body 5 is supported on wheels 7.

The truck body comprises a bottom wall 8, a top wall 9, a front wall 11, and a rear wall 12 which may be in the form of one or more doors which normally are closed when the truck is in transit. Walls 8, 9, 11 and 12, and the side walls of the truck body cooperate to provide a cargo space, generally designated by the numeral 13.

Means is provided for heating the cargo space 13, and is shown comprising a conventional wall-type heater, generally designated by the numeral 14 in Figure 1, which in the present instance, is shown detachably supported on the front wall 11 of the truck body by suitable means, partially shown at 15 in Figure 2.

The heater 14 has a burner assembly 16 in its lower end, indicated by dotted lines in Figure 1. A flexible fuel supply conduit 17 has one end connected to the burner assembly 16 and its opposite end to a cylindrical extension 18 upon which a coupling member 19 is rotatably mounted. The cylindrical member 18 has one end secured to a fitting 21 by means of a bushing 22. The fitting 21 may be permanently secured to the flexible conduit 17, as shown in Figure 2.

The cylindrical element 18 is provided at its lower end with a hexagon portion 23 for receiving a wrench to facilitate securing element 18 in the bushing 22 of fitting 21, as will be understood by reference to Figures 2 and 2A. The hexagon or nut-like portion 22 of the cylindrical element 18 has a depending semi-spherical head 24 adapted to engage the upper end of a plunger 25, mounted for vertical sliding movement in suitable guides provided in a valve housing 26 received in threaded engagement with a reduced central hub 27 of a junction box, generally designated by the numeral 32. A disk valve element 28 is carried by the plunger 25 and is constantly urged upwardly by a suitable spring 29 to engage an annular seat 31 for interrupting fuel flow to the burner, when the coupling member 19 is manipulated to disconnect the flexible burner fuel conduit 17 from the valve housing 26.

The plunger or valve stem 25 is downwardly slotted from its uppermost end, as indicated at 25' in Figure 2A, to provide a free flowing passage for the fuel gas from the interior of valve housing 26 to the conduit 17 and burner 16, when the conduit 17 is operatively connected to the cut-off valve 30. When so connected, the valve stem 25 is depressed by the downward movement of the spherical head 24, whereby the disk valve on stem 25 is moved out of engagement with its seat 31, and, at the same time, the bottom end of slot 25' in the upper end of stem 25 is moved to a position below the valve seat 31, whereby the fuel gas may flow freely into slot 25', and thence upwardly through the passage 18' in the cylindrical element 18, and into conduit 17. When the coupling member 19 is detached from the valve housing 26, spring 29 automatically moves disk valve 28 into closing engagement with its seat 31, as will be understood. A resilient sealing washer 24' is provided in the upper portion of valve housing 26, adapted to be engaged by the spherical head 24 of the cylindrical element 18, thereby to assure a leaktight connection between element 18 and valve stem 25, when the burner is functioning. The safety cut-off valve 30, above described, is well known in the trade. It has been partially shown and described in the present application to afford a clearer understanding of the operation of the present invention.

Figure 4:
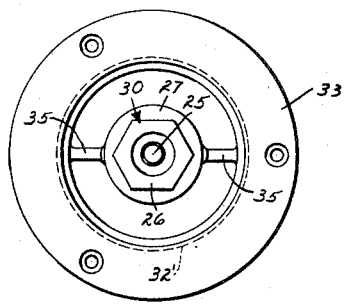
Figure 4 is a plan or top view of the junction box with the closure cap removed.
Figure 5:
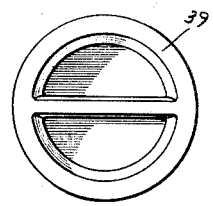
Figure 5 is a top view of the closure cap.
Figure 6:
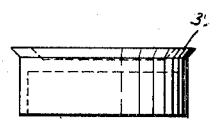
Figure 6 is a side view of the closure cap.

An important feature of the present invention resides in the construction of the junction box 32 which supports the safety cut-off valve 30 in the truck floor 8. The junction box 32 comprises a tubular body 32' provided at its upper end with an outwardly extending annual horizontal flange 33 which preferably is seated in a shallow recess 34 in the truck floor, and may be secured thereto by suitable screws, as shown in Figures 2 and 3. The upper surface of the flange 33 of the junction box is substantially flush with the surface of the truck floor 8, as clearly illustrated in Figures 2 and 3. The reduced central hub 27 of the junction box is supported in fixed spaced relation to the tubular wall of the junction box by a plurality of vertically disposed ribs 35, best illustrated in Figures 2, 3 and 4. Thus, the reduced central hub 27 may be integrally cast with the tubular body of the junction box, as will be understood.

When the flexible fuel supply conduit 17 within the cargo space is detached from the safety cut-off valve 30, the coupling member 19 is detached from the housing 26 of the cut-off valve, and a plug 36 is then substituted for the coupling member 19 to close and seal the upper end of the cut-off valve 30, as will be understood. The closure plug 36 may be secured to one end of a flexible element or chain 37, the opposite end of which is shown connected to a ring-like retainer 38 encircling the housing 26 of the safety cut-off valve 30.

When the flexible fuel supply conduit 17 is disconnected from the safety cut-off valve 30, as shown in Figure 3, a suitable closure cap, generally designated by the numeral 39, may be fitted into the upper end of the tubular body of the junction box to prevent air circulation through the junction box when the truck is operated without the heater 14, as will readily be understood by reference to Figure 3.

Gaseous fuel is supplied to the safety cut-off valve from a fuel supply means, indicated by the numeral 41, comprising a pair of conventional fuel bottles 42 mounted in a suitable carrier 43, shown suspended from the bottom of the truck body. A fuel supply conduit 44 has one end operatively connected to the fuel supply bottles 42, in the usual well-known manner, and the opposite end of said conduit is detachably connected to the lower end of the hub 27 of the junction box by a suitable fitting 45, whereby the fuel supply conduit 44 is in direct communication with the lower end of the cut-off valve 30, as shown in Figure 2.

By the use of the novel junction box herein disclosed, it will be noted that leakage of the highly explosive fuel gas into the truck body or cargo space, when detaching the flexible conduit 17 from the fixed outer fuel supply conduit 44 is positively eliminated, because when the coupling member is detached from the cut-off valve 30, the valve element 28 on the plunger 25 automatically moves into closing engagement with its seat before the threaded portion of the coupling member is completely detached from the valve housing. The closure plug 36 may then be screwed into the valve housing, and the closure cap 39 fitted into the upper end of the tubular body of the junction box, as shown in Figure 3, whereby the safety cut-off valve is completely and entirely enclosed within the junction box, whereby it cannot become damaged by movement of cargo over the junction box.

It will also be noted that when the flexible conduit 17 is operatively connected to the outer fuel supply conduit 44 through the safety cut-off valve 30, air may freely circulate through the junction box, and any obnoxious gases or fumes which may develop within the cargo space may readily escape therefrom to the atmosphere, which is a highly desirable attribute in a heating system of this general type.

The junction box has been found extremely practical in commercial use, and may readily be mounted in the floor or a wall of a truck body without difficulty. It is simple and inexpensive in construction, and may be cast of any suitable material, as for example, aluminum.

In the drawings and foregoing description, I have defined the central hub 27 of the junction box as being cast integral with the tubular wall 32' thereof. While such integral construction is to be preferred, obviously the hub 27 could be made independently of the tubular wall 32' and be provided with means for securing it therein, in axial alignment therewith. It is also to be understood that the junction 32 need not necessarily be mounted in the truck floor, as herein disclosed, as it might, in some installations, be deemed advisable to mount it in one of the upright walls of the truck body.

The foregoing detailed description has been given for clearness of understanding only, and no unnecessary limitations should be construed as broadly as permissible in view of the prior art.

I claim as my invention:

1. In a heating system for transport trucks having a body comprising side, end and top walls, and a floor, which cooperate to provide a closed cargo compartment, said heating system including a burner assembly mounted within the cargo compartment and a fuel supply means mounted exteriorly of the cargo compartment, conduit means for conducting fuel from the fuel supply to the burner, said conduit means including a burner conduit located within the cargo compartment, and a fuel supply conduit located exteriorly of the cargo compartment, a junction box comprising a tubular housing having means for fixedly securing it in an aperture in the truck floor, said housing normally being open at its top and bottom ends to permit free air circulation therethrough into and out of the cargo compartment under certain operating conditions, said housing having a hub fixed therein with its periphery spaced from the inner surface of the wall of the housing, said hub having an axial bore therein having means at its lower end for connecting the fuel supply conduit thereto, a safety cut-off valve comprising a housing having means for securing it in the upper end portion of said hub and having its lower end in direct communication with the fuel supply conduit, said cut-off valve having a spring-pressed valve element therein which is normally in closed position to prevent fuel flow to the burner, a coupling member rotatably mounted on the free end portion of the burner conduit and adapted to be received in threaded engagement with the upper end of the cut-off valve housing, and means carried by the coupling member and engageable with said valve element, when the coupling member is secured to the valve housing, thereby to automatically unseat the valve element to permit free fuel flow from the fuel supply to the burner.

2. A heating system for transport trucks of the class defined in claim 1, wherein a closure is provided for closing the junction box to prevent air circulation therethrough, when the coupling member is disengaged from the safety cut-out valve.

References Cited in the file of this patent
UNITED STATES PATENTS

| | | |
|---|---|---|
| Re. 23,223 | Anderson | May 2, 1950 |
| 614,465 | Haberman | Nov. 22, 1898 |
| 1,039,819 | Saunders | Oct. 1, 1912 |
| 1,300,925 | Calhoun | Apr. 15, 1919 |
| 1,533,482 | Voorheis | Apr. 14, 1925 |
| 1,628,337 | Shogran | May 10, 1927 |
| 1,677,634 | Horton | July 17, 1928 |
| 2,335,899 | Arvintz | Dec. 7, 1943 |
| 2,562,680 | Paquin | July 31, 1951 |

FOREIGN PATENTS

| | | |
|---|---|---|
| 147,351 | Great Britain | July 22, 1920 |